United States Patent
Turgeman (10) Patent No.: US 9,069,942 B2
(45) Date of Patent: Jun. 30, 2015

(54) METHOD AND DEVICE FOR CONFIRMING COMPUTER END-USER IDENTITY

(76) Inventor: Avi Turgeman, Holon (IL)

( * ) Notice: Subject to any disclaimer, the term of this patent is extended or adjusted under 35 U.S.C. 154(b) by 37 days.

(21) Appl. No.: 13/877,676

(22) PCT Filed: Nov. 29, 2011

(86) PCT No.: PCT/IL2011/000907
§ 371 (c)(1),
(2), (4) Date: Apr. 4, 2013

(87) PCT Pub. No.: WO2012/073233
PCT Pub. Date: Jun. 7, 2012

(65) Prior Publication Data
US 2013/0239195 A1  Sep. 12, 2013

Related U.S. Application Data

(60) Provisional application No. 61/417,479, filed on Nov. 29, 2010.

(51) Int. Cl.
*G06F 21/31* (2013.01)
*G06F 21/32* (2013.01)
*G06F 21/55* (2013.01)

(52) U.S. Cl.
CPC ............. *G06F 21/31* (2013.01); *G06F 21/316* (2013.01); *G06F 21/32* (2013.01); *G06F 21/554* (2013.01); *G06F 2221/2133* (2013.01)

(58) Field of Classification Search
CPC ....... G06F 21/31; G06F 21/316; G06F 21/32; G06F 2221/2133; G06F 21/544; H04W 36/32
USPC .......................................... 726/7, 19; 455/441
See application file for complete search history.

(56) References Cited

U.S. PATENT DOCUMENTS

| | | | | |
|---|---|---|---|---|
| 3,699,517 A * | 10/1972 | Dyche | 382/122 |
| 3,983,535 A * | 9/1976 | Herbst et al. | 382/122 |
| 4,128,829 A * | 12/1978 | Herbst et al. | 382/120 |
| 4,621,334 A * | 11/1986 | Garcia | 382/115 |
| 4,805,222 A * | 2/1989 | Young et al. | 382/115 |
| 5,485,171 A * | 1/1996 | Copper et al. | 345/160 |
| 5,557,686 A * | 9/1996 | Brown et al. | 382/115 |
| 5,838,306 A * | 11/1998 | O'Connor et al. | 345/163 |
| 5,874,941 A * | 2/1999 | Yamada | 345/157 |
| 6,337,919 B1 * | 1/2002 | Dunton | 382/124 |
| 6,572,014 B1 * | 6/2003 | Lambert | 235/380 |
| 7,139,916 B2 * | 11/2006 | Billingsley et al. | 713/182 |
| 8,433,785 B2 * | 4/2013 | Awadallah et al. | 709/224 |
| 2003/0033526 A1 * | 2/2003 | French et al. | 713/168 |
| 2005/0008148 A1 * | 1/2005 | Jacobson | 380/26 |
| 2007/0214426 A1 * | 9/2007 | Ruelle et al. | 715/767 |
| 2007/0255821 A1 * | 11/2007 | Ge et al. | 709/224 |

(Continued)

*Primary Examiner* — William Powers
*Assistant Examiner* — Tongoc Tran (57) ABSTRACT

The identity of an end-user operating a computer is confirmed by analyzing user reactions to aberrations in output. More specifically, an aberration is caused in output that the computer provides to an output device, and the end-user's response to the aberration is received. An end-user characteristic is extracted from the response and compared to stored characteristic responses to find a match. A match is indicative of the identity of the computer user. It can also be checked whether, after causing an aberration in output the end-user responded differently to the output than if the output did not have the aberration. The lack of a different response can be interpreted as indicative that the end-user is a bot.

9 Claims, 5 Drawing Sheets

(56) References Cited

U.S. PATENT DOCUMENTS

| | | | |
|---|---|---|---|
| 2007/0266305 A1* | 11/2007 | Cong et al. | 715/500.1 |
| 2007/0283416 A1* | 12/2007 | Renaud | 726/2 |
| 2008/0183745 A1* | 7/2008 | Cancel et al. | 707/102 |
| 2008/0301808 A1* | 12/2008 | Calo et al. | 726/23 |
| 2009/0094311 A1* | 4/2009 | Awadallah et al. | 709/202 |
| 2010/0077470 A1* | 3/2010 | Kozat et al. | 726/11 |
| 2010/0328074 A1* | 12/2010 | Johnson et al. | 340/573.1 |
| 2011/0012829 A1* | 1/2011 | Yao | 345/157 |
| 2011/0063211 A1* | 3/2011 | Hoerl et al. | 345/157 |
| 2011/0102570 A1* | 5/2011 | Wilf et al. | 348/77 |
| 2011/0113388 A1* | 5/2011 | Eisen et al. | 715/856 |
| 2011/0191820 A1* | 8/2011 | Ivey | 726/3 |
| 2011/0193737 A1* | 8/2011 | Chiueh | 341/176 |
| 2011/0246902 A1* | 10/2011 | Tsai et al. | 715/740 |
| 2011/0251823 A1* | 10/2011 | Davis et al. | 702/181 |
| 2012/0154273 A1* | 6/2012 | McDade et al. | 345/157 |
| 2013/0133055 A1* | 5/2013 | Ali et al. | 726/7 |

\* cited by examiner

METHOD AND DEVICE FOR CONFIRMING COMPUTER END-USER IDENTITY

RELATED APPLICATION

This application claims priority under 35 U.S.C. §119(e) to U.S. Provisional Application No. 61/417,479, filed Nov. 29, 2010, and to International Patent Application No. PCT/IL2011/000907, which are hereby incorporated by reference in their entirety.

BACKGROUND

Elaborate schemes have been devised to maintain security during interactive sessions between an end-user and a computer. Previously, a simple requirement for a single password sufficed, but malicious intrusions, by parties sometimes referred to as "hackers", resumed after such hackers were able to develop methods to bypass simple password requirements. End-users are now typically advised, and sometimes even required, to compose personal passwords of a random or semi-random nature, such as having at least one capital letter and one lower-case letter, at least one numeral, and a special character (e.g., "!", "@", "$", and "#"). End-users are often asked to change their passwords occasionally, for example, every three months.

Intruders have found ways to by-pass passwords, even those of a random nature, so other protections schemes have been developed, such as those requiring biometric data. One example of such scheme employs a fingerprint reader, so an end-user desiring to conduct an interactive session must supply the fingerprint that is associated with a particular account. However, even biometric data can be stolen and then used to gain unauthorized access to protected data.

Another growing problem is the use of bots (computer programs that run automatically) to bypass user authentication schemes. There is a need for a way to distinguish between bots and humans attempting to begin an interactive session with a computer.

Another method to confirm user identity is to implement transparent continuous authentication (TCA). TCA operates continuously during the whole user session in order to authenticate users according to their behavior or biometric behavior, for example, according to voice. This type of TCA may monitor a speaker's voice during an entire conversation with a call center.

The problem with conventional TCA is that the learning and detecting process for user confirmation is very long. Unlike requesting a password and waiting for a user response, TCA does not have standard requests that produce expected responses from authorized users and unexpected responses from unauthorized users. By not prompting particular responses, the validation method necessarily must take longer due to the need to wait for distinguishable behavior from users for confirmation.

Two common categories of solutions became known as "log-in authentication" and "continuous authentication," the former being more common.

Log-in authentication involves the transfer of "secrets" during an interactive process, such as, login-in, using USB encryption keys, and biometric authentication (fingerprint, voice, pictures, and even keystrokes and mouse dynamics). This type of authentication could be defeated by unauthorized acquisition of the secrets, such as by phishing or planning Trojan horses.

Continuous authentication, also known as "transparent continuous authentication" (TCA) involves the collecting of information in the background throughout a user session, and this form of authentication could detect an unauthorized user after his/her credentials were already stolen. Applying this transparent method, a user would not be aware that his actions are being scrutinized (unlike the awareness, for example, of being asked to provide a password). Examples of TCA include voice recognition, mouse dynamic recognition, and keystroke analysis. The drawback of this method is that the transparent process is by definition not an interactive process, so by not "involving" the user the authentication process last longer. Thus, the user had more freedom to conduct various activities before the authentication was complete. From the perspective of the protection provides, the session is considered pseudo-random, uncontrolled, unsupervised, and unpredictable.

SUMMARY

The present invention provides embodiments that authenticate end-users either while attempting to begin interactive sessions with computer or throughout user sessions to determine whether the users are authorized to use the identities they provide. The embodiments can also distinguish between human users and bots. Further, embodiments can determine if one user has created multiple identities.

Embodiments of the invention include motor control TCA, which was developed to prove the significance of current TCA solution dealing with keyboard and mouse dynamic. The concept implements theory taken from the field of mechanical robotics to imitate human movements by modeling the motor control as a complex system. A feedback loop facilitates the flow of signals among the eyes, the brain, and muscles.

Another embodiment of the invention is interactive transparent continuous authentication, which actually implements transparent continuous authentication in the background of a user session without the user being aware of the authentication process but nonetheless staying involved. Such is achieved by causing interferences (aberration) during user sessions so the users will respond but will not be aware that a test was in progress. This solution controls the session and is more predictable than "normal" TCA despite being transparent.

A further embodiment is interactive TCA. Such also provides protection against bots and Trojan horses. These automated intruders do always respond to interferences (aberrations) as human users do, and interactive TCA exploits that deficiency as discussed below.

In terms of the statutory classes of invention, the invention may be embodied as a method of confirming the identity of an end-user operating a computer. The method includes: causing an aberration in output that the computer provides to an output device; receiving a response to the aberration; extracting from the response an end-user characteristic; and comparing the extracted end-user characteristic response with stored characteristic responses to find a similarity of the end-user's response to a stored response; wherein a similarity is indicative of the identity of the computer user.

The invention may also be embodied as an alternate method of confirming the identity of an end-user operating a computer. More specifically, the method includes: causing an aberration in output that the computer provides to an output device; determining whether the end-user responds differently to the output than if the output did not have the aberration; and interpreting the lack of a different response as indicative that the end-user is a bot.

The invention may further be embodied as a device for confirming the identity of an end-user operating a computer. The device has a processor and a memory. The memory holds instructions that, when executed by the processor, cause the processor to: cause an aberration in output that the computer provides to an output device; receive a response to the aberration; extract from the response an end-user characteristic; and compare the extracted end-user characteristic response with stored characteristic responses to find a similarity of the end-user's response to a stored response. A similarity is indicative of the identity of the end-user.

The invention may additionally be embodied as a device for confirming the identity of an end-user operating a computer. The device has a processor and a memory. The memory holds instructions that, when executed by the processor, cause the device to: cause an aberration in output that the computer provides to an output device; determine whether the end-user responds differently to the output than if the output did not have the aberration; and interpret the lack of a different response as indicative that the end-user is a bot.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

DETAILED DESCRIPTION

The invention summarized above and defined by the claims below will be better understood by referring to the present detailed description of embodiments of the invention. This description is not intended to limit the scope of claims but instead to provide examples of the invention. Described first are methods embodying the invention. Described next are devices that embody the invention.

Human physiological features differ from one person to the next, and knowledge of such differences can be exploited to identify a computer end-user (or "user") based on how he/she uses the computer. This identification is made possible by observing characteristic responses of a user to unexpected output when using the computer.

Figure 1A:
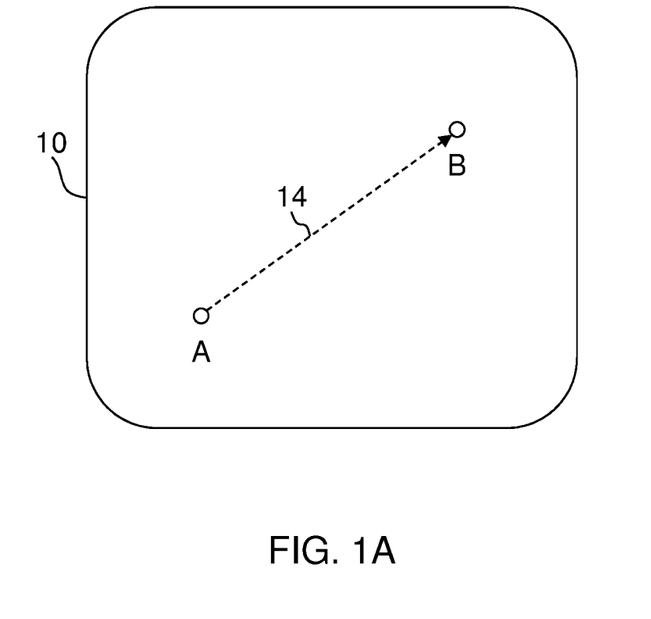
FIG. 1A illustrates the path of cursor movement on a display visible to a computer end-user.
Figure 1B:
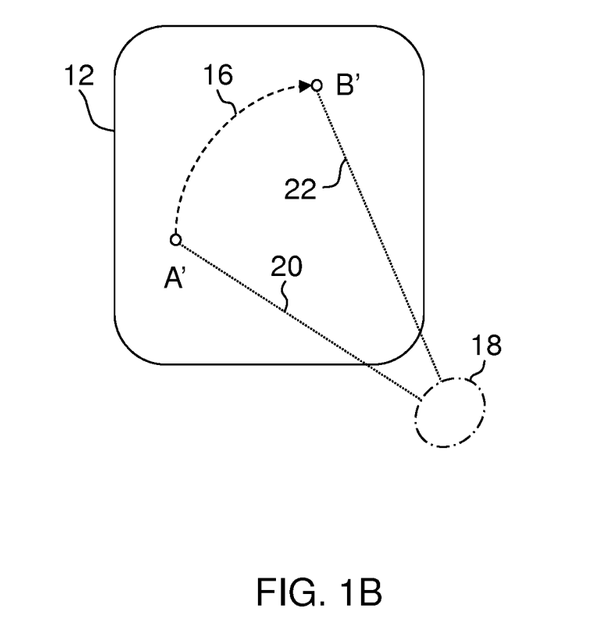
FIG. 1B illustrates mouse movement on a mouse pad to control the cursor movement on the display of FIG. 1A.

As an example, consider a computer operatively connected to the display 10 of FIG. 1A and to a mouse (not shown for clarity) that a user slides along the mouse pad 12 of FIG. 1B as is known in the art to alter the position of a mouse cursor (also not shown for clarity) displayed in the image on the display 10. The mouse cursor in this example is initially located at point A, and the user wants to reposition the cursor to point B. To effect such change in position, the user grasps with his hand the mouse, located at point A' on the mouse pad 12, and slides it to point B'.

The change in cursor position on the display 10 is represented by the straight line 14 in FIG. 1A, and the user may think of the associated motion as linear or more likely not even think consciously about the shape of the mouse's path at all. In this example, the shape of mouse's path 16 is curved, as shown in FIG. 1B for the following reason: the user rests his elbow or on a prominent forearm muscle near the elbow on a region 18 of a stationary surface, such as a desktop or a chair armrest, to act as a pivot point for the forearm as the forearm moves from position 20 to position 22 to change the mouse location. Although the mouse's path 16 is represented as an arc of a circle in FIG. 1B, more often the shape of such path is more complex, because the locations of the points A' and B' and the region 18 and length of the user's forearm are unlikely to be such that the user can move the mouse as needed by only a simple pivoting of the forearm. It may be necessary to flex and/or extend the forearm muscles and perhaps also to move or remove the pivot point.

The exact motion of the mouse's path 16 on the mouse pad 12 affects the shape of the cursor's path on the display 10, and the shape of the cursors path will usually differ from one user to the next due to differing physiological features, such as the length of the users' forearms and muscle characteristics. With sufficient tracking and recording of user characteristics that are associated with how users move mouse cursors, it is possible to identify users in the future based on past observations.

The length of the users' forearms and their muscle characteristics are only two of many physiological features that relate to trackable characteristics suitable for user identification. Additional examples of trackable characteristics include visual reaction times, internal jitter noises, muscle dexterity and control, and nervous and muscular systems reaction times. Monitoring and analyzing such physiological features for the purpose of user identification can be referred to as "motor control based transparent continuous authentication (TCA)."

Another procedure for user identification may be referred to as "motor control based interactive transparent continuous authentication." This procedure uses an algorithm to interfere with the visual display that the user sees to cause an aberration to appear in the output. The aberration can be subtle enough so that the user does not sense any mechanism attempting to confirm his/her identity. For example, if the user moves the mouse from point A' to point B' on the mouse pad 12, the procedure will prevent the cursor from moving exactly to point B on the display 10. Perhaps instead the cursor will be a little higher or to the right of point B. The user probably does not know that the interference was added by the interactive TCA algorithm during the user session. Instead, the user probably just thinks that he did not move the mouse to the appropriate position to cause the cursor to appear where he intended.

Aberrations may fall into one of two categories: continuous and local. A continuous aberration is not consciously sensed by the user. Over time, the user becomes accustomed to the conditions of the aberration, and his/her body adapts accordingly. Force field and distortion effects on cursors are examples of such conditions. Users do sense local aberrations, but they do not realize that the aberrations are caused just for the purpose of distorting output, as the types of aberrations resemble typical web experiences, such as that of a mouse cursor disappearing. With either continuous or local aberrations, a user's adaptation thereto is indicative of identity.

In all likelihood, the user will compensate for the aberration in output, and the specific compensating motions are the user's "characteristic response" that can be used for user identification. For example, one user may not compensate for the motion until he has moved the mouse to point B' and then noticed that the cursor was not displayed at point B. Then, he will move the mouse appropriately in a new attempt to bring the cursor to point B. Another user my notice the aberration significantly before the curser gets far for point A, and then she will start her compensation earlier. Of course, by initially tracking a greater number of responses to aberrations, the results later for user identification can become more significant. Also, by causing output aberrations under the motor control interactive TCA procedure, instead of merely collecting responses to unplanned conditions using the motor control based TCA, more controlled conditions are available for more significant and quicker user identification.

The present invention may be embodied as a method of confirming the identity of an end-user operating a computer. A server interfacing with a computer via a local area network (LAN) or the Internet may be programmed to perform this method. Alternatively, the method may be performed on the same computer for which its user's identity is being confirmed. The user may be operating the computer in a home or office setting. The user may instead be in a more public area, such as a bank, and using a computer commonly used by many other users in the same day.

Figure 2:
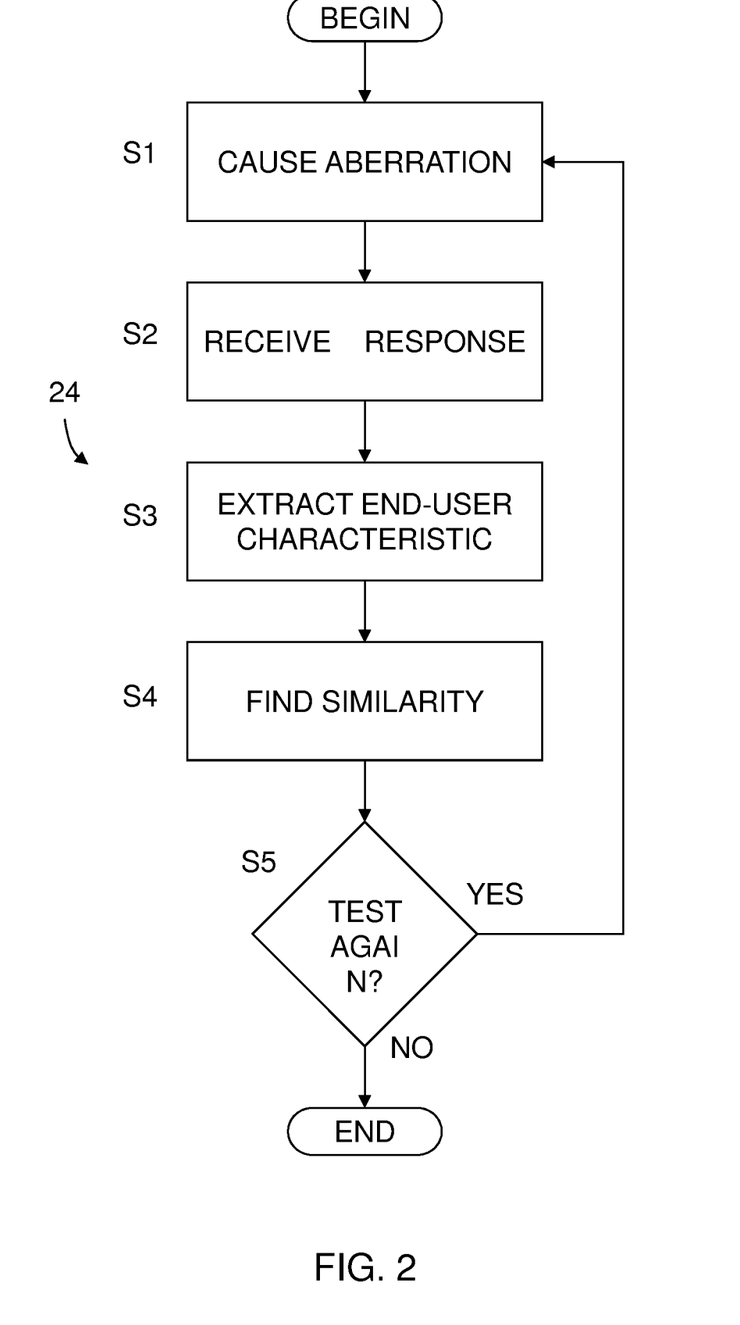
FIG. 2 presents a flowchart representing a method of confirming the identity of an end-user operating a computer.

With reference to the flowchart 24 shown in FIG. 2, this method begins by causing an aberration in output that the computer provides to an output device. (Step S1.) The output device may be a display for human use, such as the display 10 of FIG. 1A. The aberration may be caused by a software module, such as JavaScript or flash, in the computer's web browser acting according to instructions from an external server or within the computer.

It is recognized that a bot attempting to operate the computer will not need the same type of output device, for example, a visual display that a human would use. Nonetheless, the bot and its associated computer system implement an analogous type of output device to appear as a user (to "emulate" the user) to the server or other mechanism that is executing the present process of determining whether to confirm the user's identity. Instead of a standard "human" display, the bot may use instead an "emulated display" to receive output in way that attempts to appear as a human display.

As discussed earlier, the aberration of step S1 may be a diverted movement of a cursor on a display. If a bot associated with an emulated display is operating the computer, then the aberration may analogously be a diverted movement on an emulated display. The cursor movement may be diverted by changing the ratio of the angle and/or magnitude of cursor movement that the cursor movement device (or an emulated cursor movement device) specifies to the angle and/or magnitude of the movement of the cursor on the display (or on the emulated display). Types of cursor movement devices include a mouse, a trackball, a touch pad, a natural user interface (NUI) controlled for example by voice or body movement, and the like.

In certain instances, cursor movement may be controlled by a user using a device having a touch-screen display. The user's specific compensating motions upon the touch-screen are then measured to determine the user's "characteristic response" for user identification. In use of the method of the invention with a touch-screen display, the "cursor movement device" is defined as the touch-screen and its associated software for controlling cursor movement.

An emulated cursor movement device is simply the mechanism that a bot may use to communicate to the server or other mechanism executing the present method as if a genuine cursor movement device were being used. That is, the emulated cursor movement device sends signals to appear as if a human is operating the computer.

Other types of aberrations are within the scope of step S1. For example, the aberration can be the disappearance from the display of the cursor that is moved according to signals from of the cursor movement device (as opposed to a keyboard cursor, that is, the cursor that moves in response to characters entered via a keyboard). If the computer is being operated by a bot, then the disappearance would be that of the emulated cursor that moves according to signals from an emulated cursor movement device.

Another kind of aberration to use when the output device is a display (or an emulated display) is the disappearance of the keyboard cursor from the display (or the disappearance of a bot's emulated keyboard cursor from an emulated display). Some users might respond by pressing their keyboards' cursor movement keys. Other might respond by positioning their mouse cursor where they want the keyboard cursor to appear. The specifics of different responses can be used later for user identification, as discussed in more detail below.

An additional kind of aberration is the display of a character that differs from a character that a user specified using his/her keyboard (or that a bot specified using an emulated keyboard). Some users may respond quickly by pressing their keyboard's backspace key. Others may not notice the mistake immediately, especially if they do not typically view the display when typing characters. (They may focus their attention instead on documents.) When they do notice the mistakes, some may delete unwanted characters using the "backspace" key while others respond using the "delete" key. Also, programming common misspellings as aberrations differentiates users by how well they notice the misspellings.

Other types of aberrations become available when another peripheral is used the output device for this method. For example, if the output device is an audio speaker, an aberration could be an increase in volume, either by a small or a large amount (with the intention of seeing whether the user reduces the volume quickly, slowly, or not at all, or whether the user turns the sound off completely).

The preceding discussion of aberrations caused in step S1 is by no means an exhaustive list. Many other types of aberrations are suitable. The goal is to cause the user to respond in such a way to provide information useful for identifying him/her, as discussed in the following:

After the step S1 of causing the aberration, the next step is receiving a response to the aberration. (Step S2.) For example, if the aberration of step S1 was the disappearance or diverted movement of a cursor from the computer's display (or the disappearance or diverted movement of an emulated cursor from an emulated display), the response received in step S2 may be that relating to the cursor movement device (or the emulated cursor movement device) associated with the computer. As one example of the performance of Step S2, if a server is configured to perform the present method, step S2 may be performed by the server receiving the response from the computer operated by the end-user whose identity is to be confirmed. Such may be effected by client-side software, such as JavaScript or flash, installed on the computer's browser to collect raw data relating to the user response and to forward it to the server. The system may be such that the server receives the response from the computer through a LAN or the Internet. The server may instead have a direct connection to the computer, such as by a USB cable or wireless connection. (This latter system can be considered a network of two computers.) Alternatively, this method can be performed on an end-user's computer, so there is no separate server or network. Computer software may be implemented to collect raw data, as in the server example, but the data are transferred internal to the computer for receipt.

After the step S2 of receiving the response to the aberration, the next step is extracting from the response an end-user characteristic. (Step S3.) One way to extract the end-user characteristics is to analyze the raw data collected from in the client side as discussed above, extracting movement features and building a model for each user accordingly. Cross-movement features could also be extracted to enhance model accuracy. Moreover, movement could be characterized by a tag which indicates its type (for example, left/right movement). This tagging could both effected as part of the user model and also in order to create sub-models per tag type. A user's model may be based on supervised learning techniques, which treat other user data as a sample of possible adversaries and thus infer what are the features which are most relevant to detect the current user out of the entire population of users. Alternatively or additionally, a statistical model could be built for each user independently of models for other users. One example algorithm for this is a support vector machine (SVM), which analyzes data and recognizes patterns, and there are other such methods in the field of classification and machine learning.

After the step S3 of building an end-user model from the user's (bot's) response, the next step is to find a similarity of the end-user's response to a stored response. (Step S4.) Accordingly, there is a comparison of the extracted end-user characteristic with the stored responses of that user and with responses of other stored user models that are potential intruders. In each session, the user gets a score value that indicates how much the characteristics are similar to those in the model built in a previous learning process. This score can be accompanied by a certainty level that is based on a self assessment of the model to determine its accuracy. The score and accuracy could possibly be a combined value of both. Moreover, scores from different times or of different types could be integrated to improve classification performance.

A similarity of the end-user's response to a stored response is indicative of the identity of the computer user. In some implementations, though, it may be difficult to obtain enough identifying information from the only one response to an aberration, and repeating the above process can increase accuracy and accelerate the user identification process. Accordingly, it can be desirable to repeat the causing of an aberration (step S1), the receiving of the response (step S2), the extracting of an end-user characteristic (step S3), and the comparing of the end-user characteristic response with stored characteristic responses (step S4). Accordingly, it is queried whether to run the test cycle again (step S5), and if another cycle is to be performed the process flow returns to step S1 as shown in FIG. 2. For example, it may be desired to repeat the test cycle every time a repeated predetermined time period ends. If the test cycle is not to be run again, the process ends at this point.

A user's response and his extracted end-user characteristics to an aberration, may be plotted by the software of the invention, to determine the user's learning curve over time. During any specific session, several aberrations may appear, and a single human user will correct more rapidly to the aberration as the session progresses (while a bot will not). Additionally, the learning curve of a human user will be more rapid over several sessions than that of either an intruder, unfamiliar with the aberration, or of a bot. The learning curve of the identified (authentic) user will have additional measurable parameters useful for extracting end-user characteristics that may be utilized for identification of the user. Examples of additional measurable parameters of a user's learning curve include: the time a user takes to identify an aberration and the time he takes to correct for it; the continuity of the correction for the aberration; mistakes in correcting for the aberration; noises in correcting the aberration; parameters that define the level of control the user has over the output device (in spite of the aberration) such as parameters of the efficiency of cursor movement in respect to the desired user response.

Embodiments of the present inventors address the situation in which a bot, programmed to emulate an end-user, may fail to "notice" an aberration in output provided to an output device. For example, if the bot is programmed to enter "john.smith" in a user name field, and the display (or emulated display) shows "joh.ith," the bot may have no functionality to check whether "john.smith" indeed appeared as expected. The bot would simply proceed as programmed, such as, by entering a password in a password field. A human user, whether an authorized user or another human acting as if he were an authorized user, would likely respond to the display of "joh.ith" by adding the missing letters "n," "s," and "m" where appropriate.

That is, a human user would most likely respond to an aberration in output differently than if the output did not have the aberration. In contrast, a bot of lesser sophistication might not respond differently at all to the aberration. Thus, the lack of different response to the output with the aberration from the response to the output that did not have the aberration is an indication that the end-user is likely a bot. Thus, the present invention may be embodied as a method of confirming the identity of an end-user operating a computer, the method being particularly suitable for determining whether the end-user is a bot.

Figure 3:
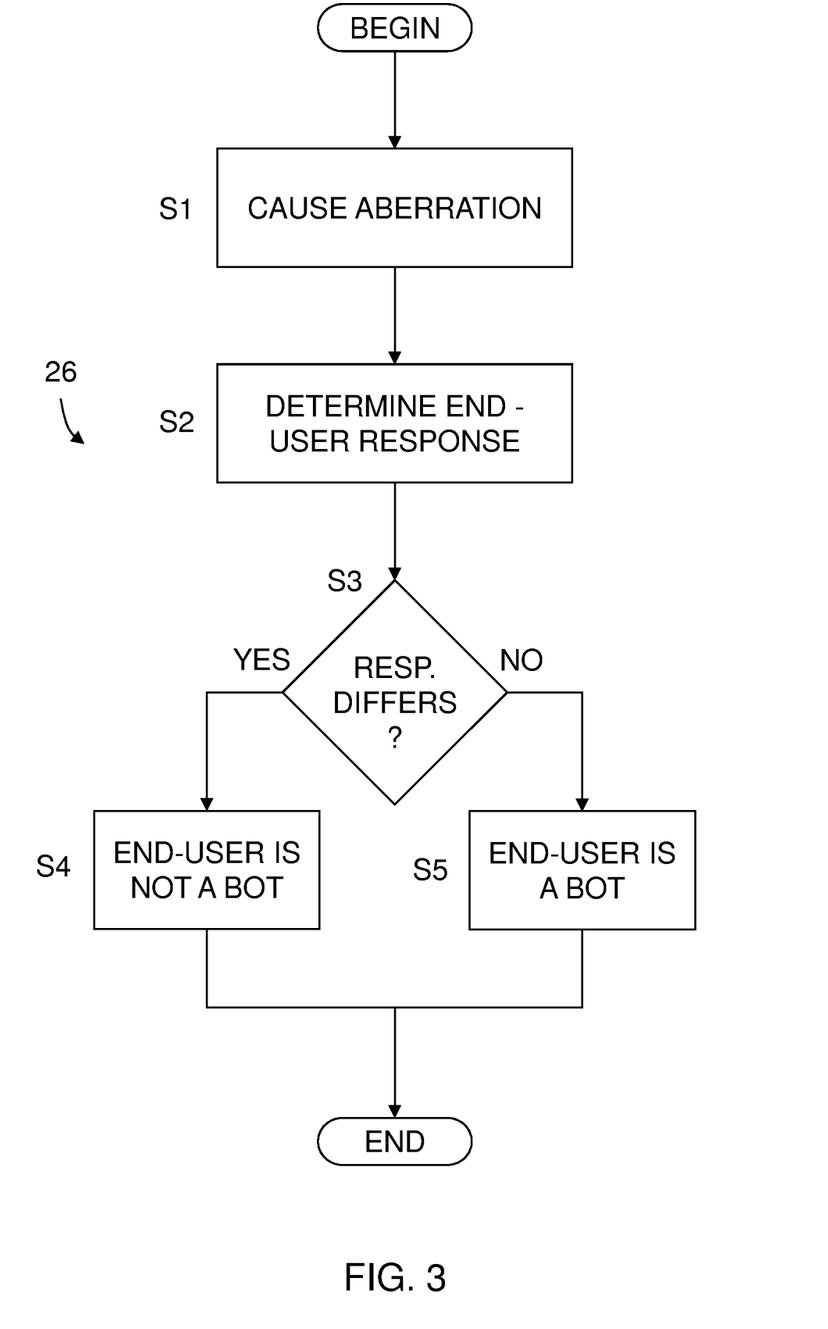
FIG. 3 presents a flowchart representing an alternate embodiment of a method of confirming the identity of an end-user operating a computer.

With reference to the flowchart 26 shown in FIG. 3, this method begins by causing an aberration in output that the computer provides to an output device. (Step S1.) Such step may be executed analogously to how step S1 of the previous embodiment described above (and in FIG. 2) is executed.

After the step S1 of causing the aberration, the next step is determining whether the end-user responds differently to the output than if the output did not have the aberration. (Step S2.) With reference to the example above, if a server or other mechanism were executing the present method, client-side software, such as JavaScript or flash, may be implemented in the computer's browser to collect any cursor movements and keystrokes of a user's response. For example, server could cause the display of "joh.ith" in a user name field after the human user or bot entered "john.smith" and then determine whether the user (or bot) attempts to add the missing "n," "s," and "m." It is assumed in this example that a human user would attempt to add the missing letters.

It is then queried whether the result of the step S2 determination is that the end-user, whether human or a bot, responded differently to the output with the aberration than if the output did not have the aberration. (Step S3.) If the result is affirmative, it is interpreted that the end-user is not a bot. (Step S4.) If instead the result is negative, it is interpreted that the end-user is a bot. (Step S5.) The process then ends.

The preceding discussions explain how the invention may be embodied to detect a bot or an unauthorized human trying to gain access to protected information as if the bot or unauthorized human were the authorized user. However, the invention can also be embodied to detect whether a single human user is acting as multiple users, for example, by having multiple user accounts. A single human user has limited control of his/her characteristic responses, so embodiments of the invention may be used to detect a single user associate with multiple user accounts under the guise of multiple users.

Figure 4:
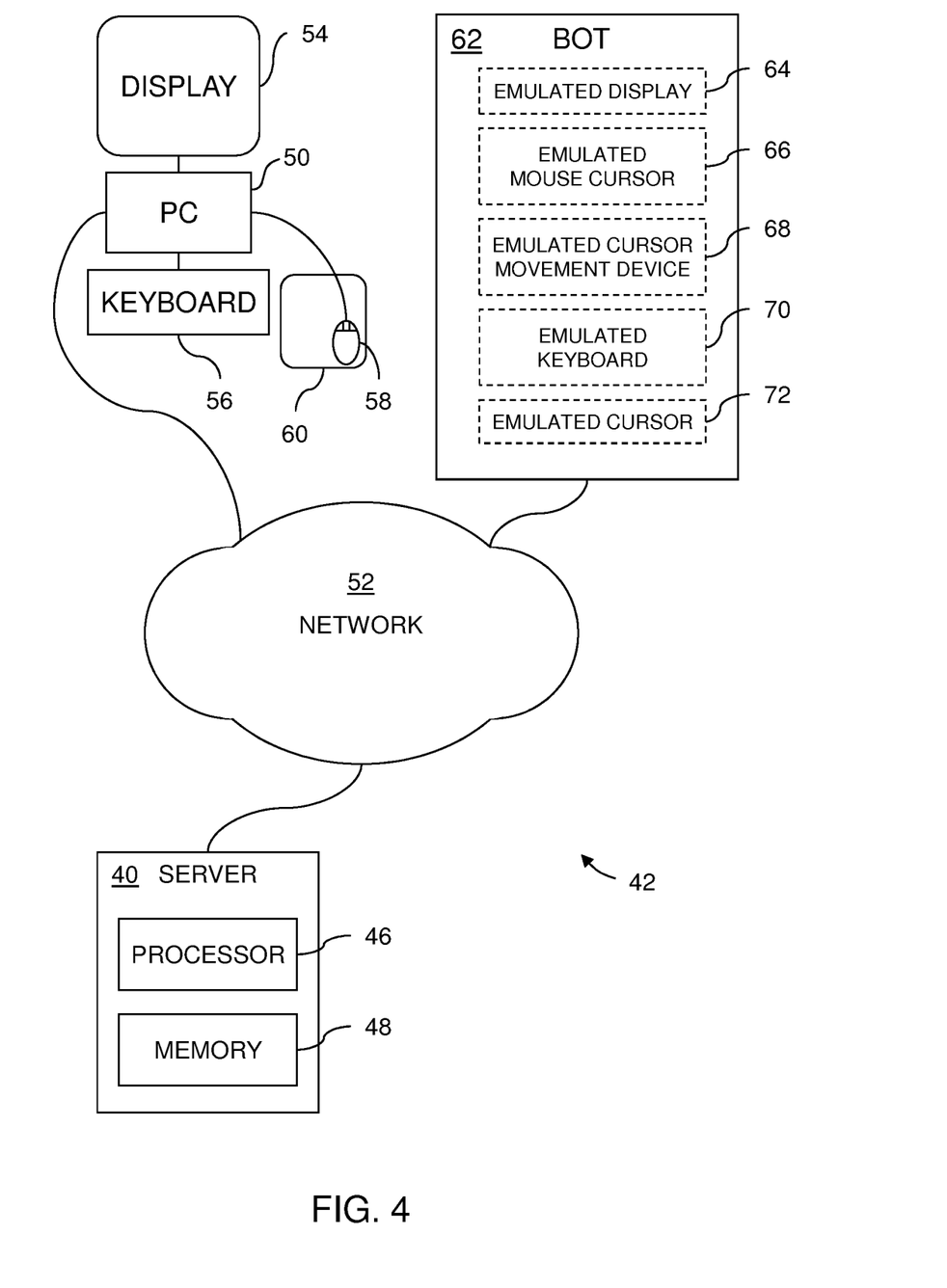
FIG. 4 illustrates a system having a device for confirming the identity of an end-user operating a computer.
Figure 5:
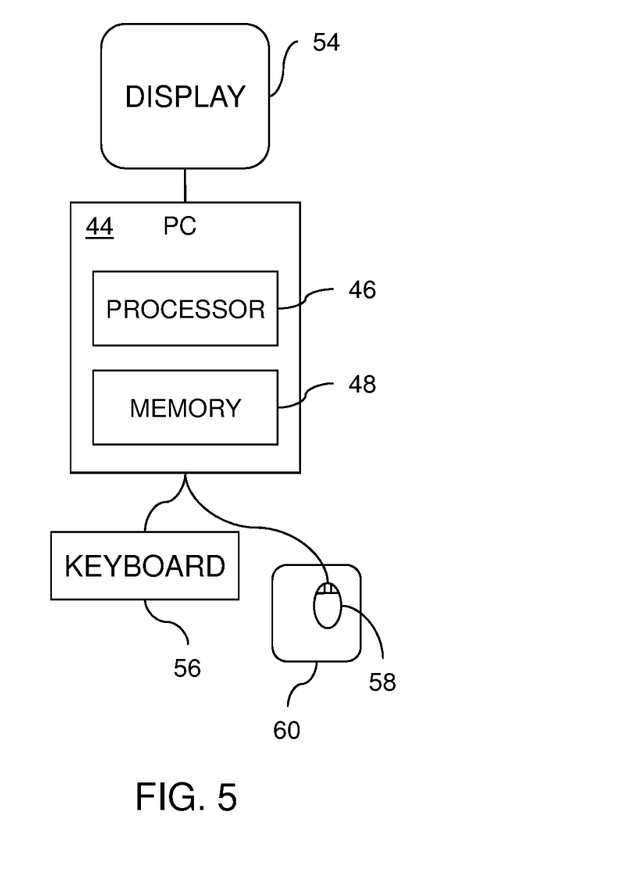
FIG. 5 illustrates an alternate embodiment of a device for confirming the identity of an end-user operating a computer.

The invention may also be embodied as a device for confirming the identity of an end-user operating a computer. The device may be a server 40, illustrated as part of the system 42 of FIG. 4, or a "stand alone" computer, such as the personal computer 44 illustrated in FIG. 5. Alternatively, the device may be another type of computing device, such as a smart phone or a tablet, as non-limiting examples. In both the implementations of FIG. 4 and of FIG. 5, the device has a processor 46 and a memory 48. The processor 46 may be an Intel Pentium Processor E5400, an Intel Xeon 5130 CPU, or any other equivalent means for processing (executing) instructions held in the memory 48. The memory 48 may be a SATA hard drive, a flash memory SSD, or any other equivalent means for storing instructions that when executed by the processor 46 cause the processor 46 to function as described herein. The memory 48 may also be an external USB flash drive. In the configuration of FIG. 5, the end-user interfaces directly with the device of the present embodiment, the personal computer 44. In the system of FIG. 4, the end-user uses a personal computer 50 to interface with the device, the server 40, through a network 52. The network 52 may be a LAN or the Internet.

As shown in FIG. 4, the personal computer 50 has operationally connected thereto a display 54, a keyboard 56, and a mouse 58 on a mouse pad 60. In alternate embodiments, a different cursor movement device may be used instead in place of the mouse 58. An end-user may to access the server 40 so its processor 46 data would process data or to view records stored in the memory 48. For example, the server 40 may be administered by a bank, and the end-user may want to use the processor 46 to effect a funds transfer. Alternatively, the end-user may want to view bank records stored in the memory 48. In any case, the bank is able to confirm the identity of an end-user that is operating the personal computer 50. The following explains how the server 40 confirms the identity. The personal computer 44 of FIG. 5 functions analogously to the server 40/personal computer 50 combination of FIG. 4.

The memory 48 holds instructions that the processor 46 executes, which results in the processor causing an aberration in output that the personal computer 44, 50 provides to the display 54. (In alternate embodiments, a different output device, such as an audio speaker, as discussed above, may be used in place of the display 54.) Examples of aberrations are as discussed above, such as, the disappearance from or a diverted movement on the display 54 of the cursor that the end-user controls using the mouse 58, the disappearance of the cursor that the end-user controls using the keyboard 56, and the display of a character that differs from the character that the end-user specified using the keyboard 56.

When the end-user experiences the aberration, he/she is likely to react accordingly. Such as, if the cursor did not appear on the display where anticipated, he/she would move the mouse 58 is a fashion to move the cursor to the desired position. The end-user's reaction is detected, for example, by client-side software, such as in a JavaScript or flash module of a web browser loaded on the personal computer 50, and the software module or equivalent detection means sends a response based thereon to the server 40, where it is received. (In the embodiment of FIG. 5, a software module of JavaScript, flash, or equivalent detection means on the personal computer 44 transfers a response internal to the personal computer 44 and is handled by the processor 46.)

After the server 40 receives the response, it extracts an end-user characteristic. Then, the server 40 compares this characteristic response with other characteristic responses, which have been stored, for example, in the memory 48 or in other storage, to find similarities that are indicative of the identity of the end-user. (In the embodiment of FIG. 5, a database of characteristic responses may reside on the memory 48 or in another location that is accessible to the processor 46.)

If desired, the server 40 of FIG. 4 and the personal computer 44 of FIG. 5 can repeatedly cause output aberrations throughout a user session to obtain additional identifying information as opposed to the information from only one response to an aberration. Repeatedly causing output aberrations can increase accuracy of and accelerate the user identification procedure as discussed above.

Also shown in FIG. 4 is a representation of a bot 62 that is operationally connected to the network 52. Unauthorized users may attempt to gain access to the server 40 by programming the bot 62 to appear to the server 40 as an authorized end-user operating a personal computer, such as the personal computer 50. The bot 62 includes as functional modules an emulated display 64, an emulated mouse cursor 66, an emulated cursor movement device 68 (such as an emulated mouse), and an emulated keyboard 70, and an emulated cursor 72 that moves according to keystrokes. The purpose of the emulation is appear to the server 40 as a human user when the server 40 sends instructions, such as those intended for an output device like a display, and when the server 40 receives responses, such as those based on user mouse movements and keystrokes. For implementations in which the server 40 expects responses from a JavaScript, flash, or like software module of a web browser, the reactions that the bot 62 emulates are received by the JavaScript module and forwarded to the server 40 for processing.

The bot 62, although programmed to emulate a human end-user as much as possible, may fail to even notice when the server 40 provides an aberration in output. As discussed above with reference to FIG. 3 (see the example of a bot sending "john.smith" in a user name field and an aberration causing an output "joh.ith"), if the bot responds no differently to an aberration than if there were no aberration, suspicion is raised that a bot is attempting to access the server 40.

Accordingly, the memory 48 of the server 40 may hold instructions that, when executed by the processor 46, cause the server 40 to cause an aberration in output that a computer, seemingly like the personal computer 50, provides to an output device, like the display 54. If the server 40 determines that there was no different response to the output aberration, the server 40 may interpret the lack of a different response as indicative that the end-user is a bot. The server 40 may be programmed to execute multiple tests such as this as desired to confirm such suspicions.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. For example, motor control TCA can be applied without the aberrations caused in user output. Accordingly, the foregoing discussion is intended to be illustrative only; the invention is limited and defined only by the following claims and equivalents thereto.

I claim:

1. A method of confirming the identity of an end-user interacting with a remote server, using an end-user electronic device, the method comprising:
   a. during an interaction session of said end-user, executed by said end-user via an input unit associated with said end-user electronic device, causing an aberration in output that is displayed upon an output unit of said end-user device,
      wherein said aberration comprises modifying input data from said input unit of said end-user device, resulting in display of said aberration upon said output unit;
   b. receiving an end-user response to the displayed aberration from said input unit of said end-user electronic device;
   c. extracting from said end-user response, a user-specific end-user characteristic that is based on the response of a specific end-user to said displayed aberration; and
   d. comparing between the user-specific end-user characteristic extracted from said end-user response; with one or more stored characteristic responses that are stored in a database of prior responses of said end-user to displayed aberrations, to find a match;
   e. wherein finding a match using said comparison, is indicative of the identity of the end-user.

2. The method of claim 1, wherein the aberration is causing the output unit to display a character that differs from a character specified for display by the end-user via a keyboard or an emulated keyboard.

3. The method of claim 1 further comprising:
   repeating the steps of: causing of an aberration, the receiving of the end-user response, the extracting of a user-specific end-user characteristic, and the comparing of the extracted user-specific end-user characteristic with stored characteristic responses.

4. The method of claim 3, wherein said comparing of the extracted user-specific end-user characteristic with stored characteristic responses comprises generating a learning curve associated with an end-user's responsiveness to aberrations.

5. The method of claim 4, wherein generating said learning curve comprises generating the learning curve by utilizing at least one measurable parameter selected from:
   the speed of correction for said aberration;
   an end-user's time for identification of an aberration;
   continuity of correction for said aberration;
   mistakes made by said end-user during correction for said aberration;
   noises in correcting said aberration; and
   parameters of the efficiency of cursor movement during correction of said aberration.

6. An apparatus for confirming the identity of an end-user operating an end-user device, the apparatus comprising:
   a processor; and
   a memory storing instructions that, when executed by the processor, cause the processor to perform a method which comprises:
   a. during an interaction session of said end-user, executed by said end-user via an input unit associated with said end-user electronic device, causing an aberration in output that is displayed upon an output unit of said end-user device,
      wherein said aberration comprises modifying input data from said input unit of said end-user device, resulting in display of said aberration upon said output unit
   b. receiving an end-user response to the displayed aberration from said input unit of said end-user electronic device;
   c. extracting from said end-user response, a user-specific end-user characteristic that is based on the response of a specific end-user to said displayed aberration; and
   d. comparing between the user-specific end-user characteristic extracted from said end-user response; with one or more stored characteristic responses that are stored in a database of prior responses of said end-user to displayed aberrations, to find a match;
   e. wherein finding a match using said comparison, is indicative of the identity of the end-user.

7. The apparatus of claim 6, wherein said input unit is operative to communicate the end-user response to the displayed aberration through a communication network.

8. The apparatus of claim 6, wherein the output unit is a display for human use or an emulated display for a bot, and
   wherein the aberration comprises a diverted movement of a cursor on the display or on the emulated display,
   wherein the diverted movement is a diversion from the movement that the end-user entered via a cursor movement device or via an emulated cursor movement device;
   wherein the cursor movement is diverted by changing one or more of the following:
   the ratio of the angle of cursor movement displayed, from that specified by said end-user;
   the magnitude of cursor movement displayed, from that specified by said end-user.

9. The apparatus of claim 6, wherein the instructions stored by the memory, when executed by the processor, cause the processor to repeat the causing of an aberration, the receiving of the end-user response, the extracting of a user-specific end-user characteristic, and the comparing of the extracted user-specific end-user characteristic with stored characteristic responses.

* * * * *